United States Patent
Kawada

(10) Patent No.: US 12,130,490 B2
(45) Date of Patent: Oct. 29, 2024

(54) SPACE RING, LENS SYSTEM, METHOD FOR MANUFACTURING SPACE RING, AND METHOD FOR ASSEMBLING LENS SYSTEM

(71) Applicant: Masakazu Kawada, Tokyo (JP)

(72) Inventor: Masakazu Kawada, Tokyo (JP)

(*) Notice: Subject to any disclaimer, the term of this patent is extended or adjusted under 35 U.S.C. 154(b) by 997 days.

(21) Appl. No.: 16/982,460

(22) PCT Filed: Mar. 19, 2018

(86) PCT No.: PCT/JP2018/010914
§ 371 (c)(1),
(2) Date: Sep. 18, 2020

(87) PCT Pub. No.: WO2019/180799
PCT Pub. Date: Sep. 26, 2019

(65) Prior Publication Data
US 2021/0080677 A1    Mar. 18, 2021

(51) Int. Cl.
*G02B 7/02* (2021.01)
*C03C 15/00* (2006.01)

(52) U.S. Cl.
CPC ............. *G02B 7/021* (2013.01); *C03C 15/00* (2013.01)

(58) Field of Classification Search
CPC ........ G02B 7/102; G02B 7/028; G02B 27/62; G02B 13/0045; G02B 7/02–023; G02B 7/025; G02B 7/026; B24B 13/00
See application file for complete search history.

(56) References Cited

U.S. PATENT DOCUMENTS

| | | | |
|---|---|---|---|
| 2,571,307 A | 10/1951 | Taylor | |
| 5,142,410 A | 8/1992 | Ono | |
| 5,557,474 A | 9/1996 | McCrary | |
| 7,471,472 B2 * | 12/2008 | Ayame | G02B 27/62 359/822 |
| 9,645,347 B2 | 5/2017 | Miyano et al. | |
| 2006/0139776 A1 * | 6/2006 | Mori | G02B 7/102 359/819 |
| 2013/0271641 A1 * | 10/2013 | Calvet | G02B 7/028 348/340 |

FOREIGN PATENT DOCUMENTS

| | | | | |
|---|---|---|---|---|
| CN | 102917838 A | * | 2/2013 | ............ B24B 29/04 |
| CN | 103309003 A | * | 9/2013 | |
| CN | 105828689 A | * | 8/2016 | ........... A61B 1/0008 |

(Continued)

*Primary Examiner* — Ephrem Z Mebrahtu
(74) *Attorney, Agent, or Firm* — David R. Stevens; Stevens Law Group

(57) ABSTRACT

The purpose of the present invention is to provide a space ring, a lens system, a method for manufacturing a space ring, and a method for assembling a lens system capable of maintaining a distance between centers of lenses with high accuracy, while easily assembling the lens system without using special equipment. A space ring configured in an annular shape or a rectangular frame shape, wherein at least one main surface 1a is having an inverted shape of a shape of a periphery side of a lens surface 2a of a lens 2 arranged at one side, and a positioning of the lens 2 is performed by surface contacting the one main surface 1a to the periphery side of the lens surface 2a of the lens 2.

13 Claims, 4 Drawing Sheets

(56) References Cited

FOREIGN PATENT DOCUMENTS

| | | | |
|---|---|---|---|
| CN | 107290836 A * | 10/2017 | ............... G02B 7/02 |
| CN | 107664831 A * | 2/2018 | ......... G02B 13/0045 |
| EP | 0 139 979 A1 | 5/1985 | |
| EP | 1 674 909 A1 | 6/2006 | |
| EP | 1850161 A1 * | 10/2007 | ............. G02B 27/62 |
| JP | 62153908 A | 7/1987 | |
| JP | 035120 | 1/1991 | |
| JP | 7113936 A | 5/1995 | |
| JP | 8240757 A | 9/1996 | |
| JP | 10123386 A | 5/1998 | |
| JP | 2002365510 A | 12/2002 | |
| JP | 2004219608 A | 8/2004 | |
| JP | 2004287141 | 10/2004 | |
| JP | 2006184464 A | 7/2006 | |
| JP | 2007155760 A | 7/2007 | |
| JP | 2011133661 A | 7/2011 | |
| JP | 201312859 A | 1/2013 | |
| JP | 20160534403 A | 11/2016 | |
| WO | 2012086263 | 6/2012 | |

* cited by examiner

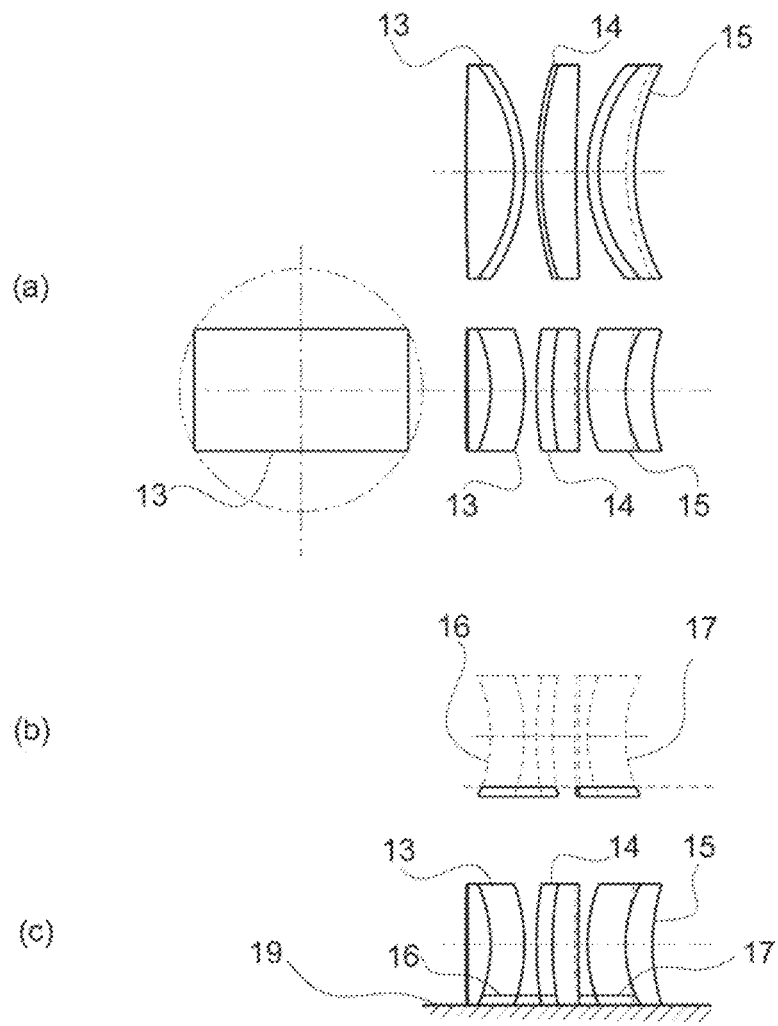
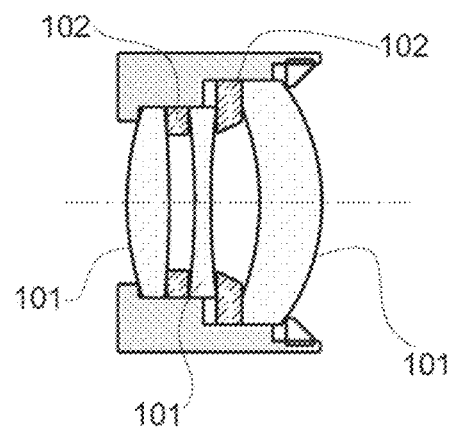
FIG.5

SPACE RING, LENS SYSTEM, METHOD FOR MANUFACTURING SPACE RING, AND METHOD FOR ASSEMBLING LENS SYSTEM

BACKGROUND OF THE INVENTION

Field of the Invention

The present invention relates to a space ring, a lens system, a method for manufacturing a space ring, and a method for assembling a lens system, and especially relates to a space ring, a lens system, a method for manufacturing a space ring, and a method for assembling a lens system capable of maintaining a distance between centers of lenses with high accuracy, while easily assembling the lens system without using special equipment.

Description of Related Art

Conventionally, in order to configure a lens system by arranging a plurality of lenses on an identical optical axis, as illustrated in FIG. 5, an air space between each lens 101, 101 is set to a predetermined spacing by intervening a space ring 102 between each lens 101, 101. However, even if a thickness of the space ring 102 is controlled with high accuracy, the space ring 102 is positioned by abutting it to an edge portion of the lens 101, so it will be affected by a shape accuracy of the edge portion or a slight chamfering of the edge portion, and an error occurs in the distance between the centers of the lenses.

In a high-accuracy lens system such as a lens system for a photograph, an objective lens for a microscope, or a projection optical system, in which an allowed error of the distance between the centers of the lenses has been little recently, a sufficient accuracy cannot be maintained by a use of the space ring 102.

As illustrated in FIG. 6, in these optical systems, each lens 101 is respectively fixed to a metal disk 103 with annular shape, and by seeing through a lens barrel 104 in which lenses 101 and metal disks 103 are inserted, a position and an inclination of each metal disk 103 in the lens barrel 104 are comprehended, and each metal disk 103 is fixed at a predetermined position in the lens barrel 104 (Patent Literature 1).

Patent Literature 1: JP 2004-219608 A

SUMMARY OF THE INVENTION

A method for assembling a lens system by seeing through the lens barrel 104 is complicated, as all lenses 101 have to be fixed respectively to the metal disks 103, and also, as special transparent equipment is required.

Here, a purpose of the present invention is to provide a space ring, a lens system, a method for manufacturing a space ring, and a method for assembling a lens system capable of maintaining a distance between centers of lenses with high accuracy, while easily assembling the lens system without using special equipment.

In order to solve the above problem, an embodiment of the present invention is a space ring configured in an annular shape or a rectangular frame shape, wherein at least one main surface is having an inverted shape of a shape of a periphery side of a lens surface of a lens arranged at one side, and a positioning of the lens is performed by surface contacting the one main surface to the periphery side of the lens surface of the lens.

In one embodiment of the space ring, one and other main surfaces are respectively having an inverted shape of a shape of a periphery side of a lens surface of one lens arranged at one side and other lens arranged at other side, a positioning of the one lens and the other lens is performed by surface contacting the one main surface to the periphery side of the lens surface of the one lens and by surface contacting the other main surface to the periphery side of the lens surface of the other lens, and a mutual positioning between each lens is also performed.

In an embodiment, the space ring is formed by a glass material.

An embodiment of the present invention is a lens system comprising: a plurality of lenses with a circular or rectangular outer periphery; and a space ring intervening between one lens of the plurality of lenses and other lens adjacent to the one lens, wherein the space ring is configured in an annular shape or a rectangular frame shape corresponding to a shape of the outer periphery of the plurality of lenses, one and other main surfaces are respectively having an inverted shape of a shape of a periphery side of a lens surface of the one lens arranged at one side and the other lens arranged at other side, a positioning of the one lens and the other lens is performed by surface contacting the one main surface to the periphery side of the lens surface of the one lens and by surface contacting the other main surface to the periphery side of the lens surface of the other lens, and a mutual positioning between each lens is also performed.

In an embodiment, the space ring is formed by a glass material.

A method for manufacturing a space ring may include: forming a flat plate body in which one or both of main surfaces are respectively having an inverted shape of a shape of a lens surface of one or two lenses to be an object of positioning; and forming a through hole at a center of the flat plate body to form the space ring in an annular shape or a rectangular frame shape.

One aspect includes forming the space ring by a glass material.

A method for assembling a lens system may include: forming a flat plate body in which both main surfaces are respectively having an inverted shape of a shape of a lens surface of one lens having circular outer periphery and other lens adjacent to the one lens; forming a laminated body by surface contacting, superposing, and joining respective lens surface and the main surfaces of the flat plate body in an order of the one lens, the flat plate body and the other lens; grinding an outer periphery of the laminated body to be a rectangular shape; separating the laminated body into the one lens, the flat plate body, and the other lens; forming a rectangular frame-shaped space ring by forming a through hole at a center of the flat plate body; and surface contacting and superposing respective lens surface and the main surfaces of the space ring in an order of the one lens, the space ring and the other lens.

In the present invention, at least one of the main surfaces of the space ring is having an inverted shape of a shape of a periphery side of a lens surface of a lens to be an object of positioning, and a positioning of the lens is performed by surface contacting the main surface to the periphery side of the lens surface of the lens.

In other words, the present invention can provide a space ring, a lens system, a method for manufacturing a space ring, and a method for assembling a lens system capable of maintaining a distance between centers of lenses with high accuracy, while easily assembling the lens system without using special equipment.

BRIEF DESCRIPTION OF THE DRAWINGS

FIG. 4 is a front view, a plan view and a side view illustrating a method for assembling the lens system relating to the present invention.

FIG. 5 is a longitudinal sectional view of a lens system assembled using a conventional space ring.

DETAILED DESCRIPTION OF THE INVENTION

Figure 1:
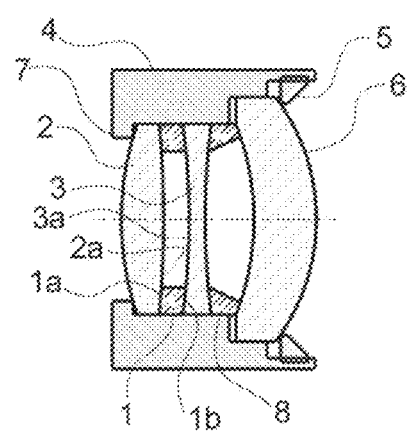
FIG. 1 is a longitudinal sectional view illustrating a lens system assembled using a space ring relating to the present invention.

Hereinafter, explaining about embodiments of the present invention, by referring to the drawings.

[Space Ring and Lens System]

FIG. 1 is a longitudinal sectional view illustrating a lens system assembled using a space ring relating to the present invention.

As illustrated in FIG. 1, a space ring 1 relating to the present invention is a space ring 1 configured in an annular shape or a rectangular frame shape, wherein at least one main surface 1a is having an inverted shape of a shape of a periphery side of a lens surface 2a of a lens 2 arranged at one side, and a positioning of the lens 2 is performed by surface contacting the one main surface 1a to the periphery side of the lens surface 2a of the lens 2.

The inverted shape of a shape of the periphery side of the lens surface 2a is a shape joining to a shape of the periphery side of the lens surface 2a, and the inverted shape is convex when a shape of the periphery side of the lens surface 2a is concave, and the inverted shape is concave when a shape of the periphery side of the lens surface 2a is convex. A relation of such shapes is a relation of a mold and an object formed by the mold.

It is preferable that this space ring 1 is configured in an annular shape when a periphery of a lens to be an object of positioning is in a circular shape, and that this space ring 1 is configured in a rectangular frame shape when a periphery of a lens to be an object of positioning is in a rectangular shape.

In many cases, this space ring 1 intervenes between two lenses, and used to define a relative position relation of these lenses. In other words, as illustrated in FIG. 1, in this space ring 1, one and other main surfaces 1a, 1b are respectively having an inverted shape of a shape of a periphery side of a lens surface 2a, 3a of one lens 2 arranged at one side and other lens 3 arranged at other side, a positioning of the one lens 2 and the other lens 3 is performed by surface contacting the one main surface 1a to the periphery side of the lens surface 2a of the one lens 2 and by surface contacting the other main surface 1b to the periphery side of the lens surface 3a of the other lens 3, and a mutual positioning between each lens 2, 3 is also performed.

And, this space ring 1 and each lens 2, 3 are housed in a lens barrel 4 to configure a lens system. Same applies even if a number of the space ring and the lens are increased further.

In one end (left side in FIG. 1) of the lens barrel 4, a flange 7 is formed at inner periphery of an open end, and an inner diameter of an opening is smaller than an outer diameter of the lens 2 closest to the one end. This flange 7 positions the lens 2 closest to the one end at the one end of the lens barrel 4. Other end (a side from which the space ring 1 and each lens 2, 3 are inserted into the lens barrel 4) of the lens barrel 4 is an open end, and an annular screw 5 is screwed in to hold a lens 6 closest to the other end. It is preferable that a portion of these flange 7 and annular screw 5 abutting to the lens 2, 6 is having a shape surface contacting to the lens 2, 6 as well as the space ring 1.

In this space ring 1, there is no problem caused by abutting to an edge portion of a lens as the conventional space ring. Therefore, this space ring defines an air space between each lens 2, 3 precisely with high accuracy.

In addition, this space ring 1 surface contacts to the lenses 2, 3, so even if the lenses 2, 3 are pushed to contact the space ring 1, a deformation or a breakage of the lenses 2, 3 is inhibited.

A material composing this space ring 1 is not limited specifically as long as it is a material having a necessary rigidity (a rigidity to the extent that it will not be deformed by a pressing force from each lens 2, 3) such as a metal material, a synthetic resin (plastic) material, a glass material, or a ceramic material. When forming the space ring 1 by a glass material, it is preferable to form the space ring 1 by a material identical to any of optical materials composing the lenses 2, 3, or to form the space ring 1 by an opaque "crystallized glass", which is not an optical material. When the material identical to any of optical materials composing the lenses 2, 3 is used, a coefficient of thermal expansion will be identical with any of the lenses 2, 3, so it is preferable. In addition, when the space ring 1 is composed by a glass material, it can be composed by applying a processing technology (grinding and polishing, or molding by metal mold) of a lens.

In addition, it is preferable to compose the space ring 1 by a material with low thermal expansion coefficient such as a glass material, a ceramic material, or a low expansion metal. For example, in a lens system with high accuracy for lithography, a heat treatment of a metal frame material is necessary, in order to prevent a thermal expansion or a secular deformation of metal (by residual stress), but if the space ring 1 is composed by a material with low thermal expansion coefficient, a lens system resistant to a thermal change in environment is achieved. Also, a low expansion metal and ceramics can be processed to a shape and accuracy equivalent to a glass material.

Further, this space ring 1 is also having an effect as below. In other words, a conventional space ring cannot be used by joining it to a lens, but this space ring 1 can be used by joining it to a lens, while maintaining an air space between lenses with high accuracy. For example, when assembling lenses, a combination of two lenses of positive and negative lenses are used for a correction of chromatic aberration, but a performance will be stabilized, and also, a handling will be easy when these lenses are joined.

When joining the space ring 1 to a lens, it is necessary to form a hole or a groove for venting air at a side surface of the space ring 1. However, a significant effect can be expected in a stability of accuracy at the time of manufacturing, as a lens block, in which a decentering and an error of spacing are critical, can be adjusted and fixed in advance. A significant cost down can be achieved in a manufacturing of an objective lens, as the manufacturing will be remarkably easy compared to a conventional method to cut a lens after attaching the lens to a frame.

[Method for Manufacturing Space Ring]

Figure 2:
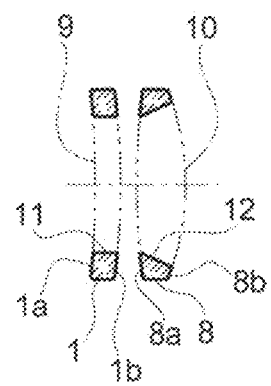
FIG. 2 is a longitudinal sectional view illustrating the space ring relating to the present invention.

FIG. 2 is a longitudinal sectional view illustrating the space ring relating to the present invention.

As illustrated in FIG. 2, in order to manufacture the space ring 1, 8 as the above, at first, a flat plate body 9, 10 in which one or both of main surfaces 1a, 1b, 8a, 8b are respectively having an inverted shape of a shape of a lens surface of one or two lenses to be an object of positioning is produced (in addition, here, it is explained about two space rings 1, 8, but the space rings are manufacturing per one). A center thickness of this flat plate body 9, 10 coincides to a spacing between lens surfaces of lenses to be an object of positioning.

Such flat plate body 9, 10 can be produced by an injection molding or a press molding, by using lenses to be an object of positioning themselves as (a part of) a mold. Even if the lenses themselves are not used as the mold, other members molded by molds for molding these lenses can be used as a mold.

As a material for composing such flat plate body 9, 10, as mentioned in the above, various materials can be used.

Next, the space ring 1, 8 can be manufactured by forming the flat plate body 9, 10 to be an annular shape or a rectangular frame shape by forming a through hole 11, 12 at a center of the flat plate body 9, 10. Both main surfaces 1a, 1b, 8a, 8b at a periphery of the through hole 11, 12 are remaining surfaces of the surfaces having the inverted shape of a shape of the periphery side of the lens surface of the lenses to be the object of positioning.

[Method for Assembling Lens System]

Next, explaining about a method for assembling a lens system relating to the present invention for assembling a lens system composed of a plurality of rectangular lenses.

Most of optical systems currently used generally are composed of lenses with circular outer periphery and retaining members consist basically of a cylindrical lens barrel. This is because an assembling with high accuracy is difficult for lenses in which outer periphery is having a shape other than a circular shape such as a rectangular shape. However, an imaging element and an image display screen (display) are having a rectangular shape, so it is not necessary for the outer periphery to be a circular shape as an imaging lens or a projection lens. For example, in a stereography and the like, there is a limit in a circular lens regarding a demand that a plurality of imaging elements should be arranged as close as possible to each other.

Here, in the present invention, a method for assembling a lens system capable of performing an alignment of optical axes and maintaining accuracy of an air space between lenses, in which outer periphery is having a shape other than circular shape, by using a manner to fill an air space between lenses by a substance such as glass by applying the space ring, is proposed.

Figure 3:
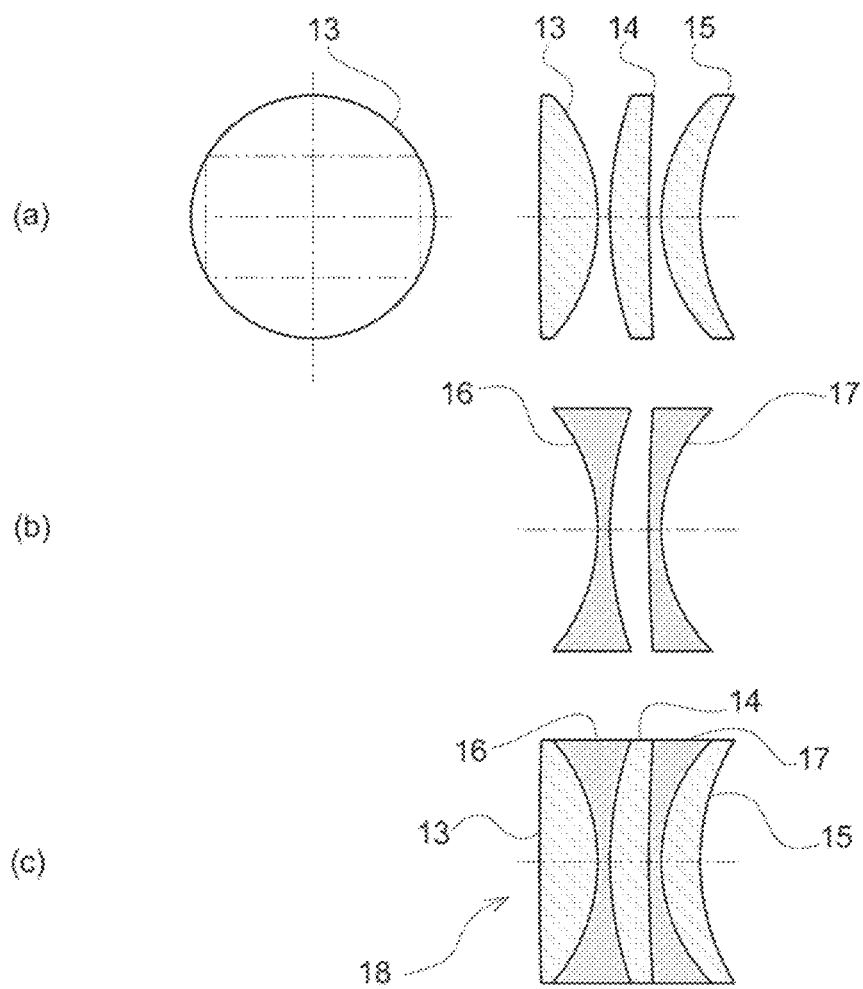
FIG. 3 is a front view and a longitudinal sectional view illustrating a method for assembling the lens system relating to the present invention.
Figure 6:
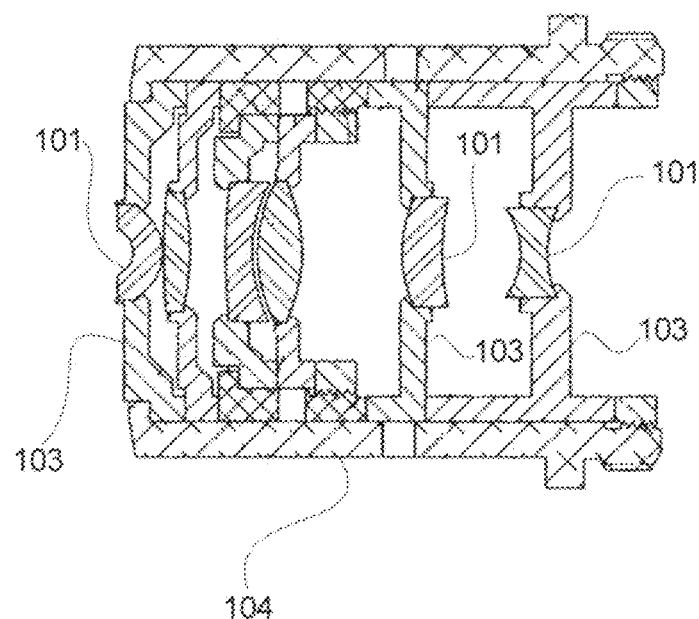
FIG. 6 is a longitudinal sectional view of a conventional lens system with high accuracy.

FIG. 3 is a front view and a longitudinal sectional view illustrating a method for assembling the lens system relating to the present invention.

FIG. 4 is a front view, a plan view and a side view illustrating a method for assembling the lens system relating to the present invention.

In a method for assembling this lens system, at first, as illustrated in FIG. 3(a), a plurality of lenses 13, 14, 15 having circular outer periphery are prepared. And, as illustrated in FIG. 3(b), flat plate bodies 16, 17 respectively in a shape corresponding to a predetermined air space between the plurality of lenses 13, 14, 15 are formed. In these flat plate bodies 16, 17, both main surfaces are respectively having an inverted shape of a shape of a lens surface of the lenses 13, 14, 15, and it is similar to the flat plate body in the manufacturing process of the space ring. As mentioned in the above, various materials such as a synthetic resin material, a metal material, or a glass material can be used as a material of these flat plate bodies 16, 17.

And, as illustrated in FIG. 3(c), each lens 13, 14, 15 and each flat plate body 16, 17 are superposed in a predetermined order, and lens surfaces of each lens 13, 14, 15 and main surfaces of each flat plate body 16, 17 are surface contacted and joined to be a laminated body 18. A thermoplastic adhesive (paste) can be used to this joining.

Next, grinding an outer periphery of the laminated body 18 to process an outer periphery of each lens 13, 14, 15 and each flat plate body 16, 17 to be a rectangular shape in a state of the laminated body 18. Here, an outer periphery of each lens 13, 14, 15 and each flat plate body 16, 17 can be processed to a rectangular shape separately, but by processing as the laminated body 18, it is possible to coincide respective shape of the outer periphery, so it is preferable from a point of view of number of processing.

Then, the laminated body 18 is separated to each lens 13, 14, 15 and each flat plate body 16, 17. As illustrated in FIG. 4(a), the outer periphery of each lens 13, 14, 15 is having a rectangular shape.

As illustrated in FIG. 4(b), each flat plate body 16, 17 can be a rectangular frame shaped space ring by forming a through hole at a center of the flat plate body 16, 17, or only a part of the flat plate body 16, 17 can be used as a spacer. In any case, at least a part of the main surfaces which is the surface contacting the lens surface of each lens 13, 14, 15 remains.

And, as illustrated in FIG. 4(c), each lens 13, 14, 15 and each spacer or space ring formed from each flat plate body 16, 17 are superposed in a predetermined order by surface contacting respective lens surface and main surface. At this time, each lens 13, 14, 15 and each spacer or space ring may be fixed on a substrate material (base) 19.

In addition, in this explanation, a lens system composed of three lenses is indicated, but a number of lenses composing a lens system is not limited particularly.

A lens system assembled in this manner can be used preferably to a stereoscopic optical system in which a distance between centers or a stacking of optical system units of a projection optical system such as 3D display has to be close to each other. In addition, it can be applied to off-axis lens arrangement of "Scheimpflug optical system" used for inclining an image surface or a substance surface.

Glossary of Drawing References

1 Space ring
1a, 1b Main surface
2, 3 Lens
2a Lens surface
4 Lens barrel
9, 10 Flat plate body
11, 12 Through hole

The invention claimed is:
1. A method for assembling a lens system comprising:
forming a flat plate body in which both main surfaces are respectively having an inverted shape of a shape of a lens surface of one lens having circular outer periphery and other lens adjacent to the one lens;
forming a laminated body by surface contacting, superposing, and joining respective lens surface and the main surfaces of the flat plate body in an order of the one lens, the flat plate body and the other lens;

grinding an outer periphery of the laminated body to be a rectangular shape;

separating the laminated body into the one lens, the flat plate body, and the other lens;

forming a rectangular frame-shaped space ring by forming a through hole at a center of the flat plate body; and surface contacting and superposing respective lens surface and the main surfaces of the space ring in an order of the one lens, the space ring and the other lens.

2. A lens system assembled by the method for assembling the lens system according to claim 1.

3. A method for manufacturing a spacer comprising:

forming a flat plate body in which one or both of main surfaces are respectively having an inverted shape of a shape of a lens surface of one or two lenses to be an object of positioning;

forming a laminated body by surface contacting, superposing, and joining the main surfaces of the flat plate body with a lens surface of one lens and a lens surface of other lens;

grinding an outer periphery of the laminated body;

separating the flat plate body, which is having same outer peripheral shape with at least one of the one lens and the other lens in which an outer periphery is processed by the grinding, from the laminated body; and shaping the spacer to a shape comprising a part of the main surfaces of the flat plate body, in which the main surfaces are surface contacting the lens surface of the one lens and the lens surface of the other lens.

4. The method for manufacturing the spacer according to claim 3, wherein processing an outer peripheral shape of the laminated body by the grinding, and shaping the spacer in a frame shape with a through hole formed at a center of the flat plate body, and the through hole is in a shape corresponding to an outer peripheral shape of the flat plate body processed by the grinding.

5. The method for manufacturing the spacer according to claim 4, wherein processing the outer peripheral shape of the laminated body to a circular shape or a rectangular shape by the grinding, and shaping the spacer in an annular shape or a rectangular frame shape by forming a through hole at a center of the flat plate body separated from the laminated body.

6. The method for manufacturing the spacer according to claim 3, wherein processing an outer peripheral shape of the laminated body to a rectangular shape by the grinding, and shaping the spacer to a shape comprising a part of the main surfaces of the flat plate body separated from the laminated body, in which the main surfaces are surface contacting the lens surface of the one lens and the lens surface of the other lens.

7. The method for manufacturing the spacer according to claim 3, wherein the flat plate body is formed by a glass material or a ceramic material.

8. A method for assembling a lens system comprising:

forming a flat plate body in which both main surfaces are respectively having an inverted shape of a shape of a lens surface of one lens having circular outer periphery and other lens adjacent to the one lens;

forming a laminated body by surface contacting, superposing, and joining respective lens surface and the main surfaces of the flat plate body in an order of the one lens, the flat plate body and the other lens;

grinding an outer periphery of the laminated body;

separating the laminated body into the one lens, the flat plate body, and the other lens;

forming a spacer by remaining a part of the main surfaces of the flat plate body having an outer peripheral shape processed by the grinding, in which the main surfaces are surface contacting the lens surface of the one lens and the lens surface of the other lens; and surface contacting and superposing respective lens surface and the main surfaces of the spacer in an order of the one lens, the spacer and the other lens.

9. The method for assembling the lens system according to claim 8, wherein processing an outer peripheral shape of the laminated body by the grinding, and shaping the spacer in a frame shape with a through hole formed at a center of the flat plate body, and the through hole is in a shape corresponding to the outer peripheral shape of the flat plate body processed by the grinding.

10. The method for assembling the lens system according to claim 9, wherein processing the outer peripheral shape of the laminated body to a circular shape or a rectangular shape by the grinding, and shaping the spacer in an annular shape or a rectangular frame shape by forming a through hole at a center of the flat plate body separated from the laminated body.

11. The method for assembling the lens system according to claim 8, wherein processing an outer peripheral shape of the laminated body to a rectangular shape by the grinding, and shaping the spacer to a shape remaining one side of a rectangular frame shape corresponding to the outer peripheral shape of the flat plate body separated from the laminated body.

12. The method for assembling the lens system according claim 8, wherein the flat plate body is formed by a glass material or a ceramic material.

13. A lens system assembled by the method for assembling the lens system according to claim 8.

* * * * *